US010289562B2

(12) United States Patent
Brandt et al.

(10) Patent No.: US 10,289,562 B2
(45) Date of Patent: *May 14, 2019

(54) INCORPORATING PURGE HISTORY INTO LEAST-RECENTLY-USED STATES OF A TRANSLATION LOOKASIDE BUFFER (71) Applicant: International Business Machines Corporation, Armonk, NY (US)

(72) Inventors: Uwe Brandt, Stuttgart (DE); Markus Helms, Boeblingen (DE); Thomas Köhler, Holzgerlingen (DE); Frank Lehnert, Weil im Schoenbuch (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/623,755

(22) Filed: Jun. 15, 2017

(65) Prior Publication Data
US 2018/0365169 A1 Dec. 20, 2018

(51) Int. Cl.
*G06F 12/0891* (2016.01)
*G06F 12/1045* (2016.01)

(52) U.S. Cl.
CPC ...... *G06F 12/1063* (2013.01); *G06F 12/0891* (2013.01); *G06F 2212/657* (2013.01); *G06F 2212/681* (2013.01)

(58) Field of Classification Search
None
See application file for complete search history.

(56) References Cited

U.S. PATENT DOCUMENTS

| 5,491,806 | A  | * | 2/1996 | Horstmann ......... G06F 12/1027 |
|           |    |   |        | 711/207 |
| 6,453,387 | B1 |   | 9/2002 | Lozano |
| 7,925,859 | B2 |   | 4/2011 | Banerjee |
| 8,984,254 | B2 |   | 3/2015 | Tran |
| 2009/0049272 | A1 |   | 2/2009 | Brunheroto |

(Continued)

OTHER PUBLICATIONS

List of IBM Patents or Patent Applications Treated as Related; (Appendix P), Filed Nov. 14, 2017; 2 pages.

(Continued)

*Primary Examiner* — Denise Tran
(74) *Attorney, Agent, or Firm* — Cantor Colburn LLP; William Kinnaman (57) ABSTRACT

A computer-implemented method includes associating an initial use order with a plurality of target sets of a translation lookaside buffer (TLB), where the initial use order indicates an order of use of the plurality of target sets. The plurality of target sets are associated with an initial least-recently-used (LRU) state based on the initial use order. A new use order for the plurality of target sets is generated. Generating the new use order includes moving a first target set to a least-recently-used position, responsive to a purge of the first target set. The LRU state of the plurality of target sets is updated based on the new use order, responsive to the purge of the first target set. The first target set is identified as eligible for replacement according to an LRU replacement policy of the TLB, based at least in part on the purge of the first target set.

13 Claims, 4 Drawing Sheets

(56) References Cited

U.S. PATENT DOCUMENTS

2016/0140040 A1   5/2016   Mukherjee

OTHER PUBLICATIONS

Uwe Brandt et al."Incorporating Purge History Into Least-Recently-Used States of a Translation Lookaside Buffer", U.S. Appl. No. 15/811,807, filed Nov. 14, 2017.
Kumari et al.; "Simulation of LRU Page Replacement Algorithm for Improving Performance of System"; Int.J.Computer Technology & Applications,vol. 4 (4); ISSN:2229-6093; pp. 683-685.
"Regioned Least Recently Used Destage Algorithm"; IP.com No. IPCOM000205106D; Mar. 15, 2017; 3 pages.

* cited by examiner

FIG. 1

TIME 1

| 130 | 130 | 130 | 130 | 130 | 130 |
|---|---|---|---|---|---|
| V | V | V | V | V | V |

140

USE ORDER: $S_0, S_1, S_2, S_3, S_4, S_5$

TIME 2

$S_2$ and $S_4$ are purged

TIME 3

| 130 | 130 | 130 | 130 | 130 | 130 |
|---|---|---|---|---|---|
| V | X | V | X | V | V |

140

USE ORDER: $S_0, S_1, S_3, S_5, S_2, S_4$

INCORPORATING PURGE HISTORY INTO LEAST-RECENTLY-USED STATES OF A TRANSLATION LOOKASIDE BUFFER

BACKGROUND

The present invention relates to translation lookaside buffers and, more specifically, to incorporating purge history into least-recently-used states of a translation lookaside buffer.

A translation lookaside buffer (TLB) is a memory cache that stores recent translations between virtual memory and physical memory, to reduce access time to physical memory. The TLB can reside between a central processing unit (CPU) and CPU cache, between caches, or between the CPU cache and main memory, for example. When a virtual address is to be translated, the TLB is checked to determine whether a translation is already stored. If a translation for the virtual address is found in the TLB, this is referred to as a hit. If no translation is found in the TLB, this is a miss, and the translation then requires checking page tables to determine the corresponding physical address to the virtual address.

Some computer systems can include multiple levels of TLBs, and in that case, the various levels may vary in size, such that a smaller TLB may allow faster access to stored translations. For instance, some systems include a TLB2, which is a second-level TLB in addition to a smaller TLB. In some cases, a TLB2 includes multiple compartments, each of which includes multiple page table entry (PTE) sets. Each PTE set represents a translation from a virtual page to a physical page.

Generally, a TLB uses a replacement policy to determine which entry is replaced when the TLB is full and a new translation needs to be inserted into the TLB. For example, a common replacement policy dictates replacing data in the least-recently-used PTE set with the new translation.

SUMMARY

Embodiments of the present invention are directed to a computer-implemented method for incorporating purge history into least-recently-used (LRU) states of a translation lookaside buffer (TLB). A non-limiting example of the computer-implemented method includes associating an initial use order with a plurality of target sets of a TLB, where the initial use order indicates an order of use of the plurality of target sets. The plurality of target sets are associated with an initial LRU state based on the initial use order. A new use order for the plurality of target sets is generated. Generating the new use order includes moving a first target set of the plurality of target sets to a least-recently-used position, responsive to a purge of the first target set. The LRU state of the plurality of target sets is updated based on the new use order for the plurality of target sets, responsive to the purge of the first target set. The first target set is identified as eligible for replacement according to an LRU replacement policy of the TLB, based at least in part on the purge of the first target set.

Embodiments of the present invention are directed to a system for incorporating purge history into LRU states of a TLB. A non-limiting example of the system includes a memory having computer-readable instructions and one or more processors for executing the computer-readable instructions. The computer-readable instructions include associating an initial use order with a plurality of target sets of a TLB, where the initial use order indicates an order of use of the plurality of target sets. Further according to the computer-readable instructions, the plurality of target sets are associated with an initial LRU state based on the initial use order. A new use order for the plurality of target sets is generated. Generating the new use order includes moving a first target set of the plurality of target sets to a least-recently-used position, responsive to a purge of the first target set. The LRU state of the plurality of target sets is updated based on the new use order for the plurality of target sets, responsive to the purge of the first target set. The first target set is identified as eligible for replacement according to an LRU replacement policy of the TLB, based at least in part on the purge of the first target set.

Embodiments of the invention are directed to a computer-program product for incorporating purge history into LRU states of a TLB, the computer-program product comprising a computer-readable storage medium having program instructions embodied therewith. The program instructions are executable by a processor to cause the processor to perform a method. A non-limiting example of the method includes associating an initial use order with a plurality of target sets of a TLB, where the initial use order indicates an order of use of the plurality of target sets. Further according to the method, the plurality of target sets are associated with an initial LRU state based on the initial use order. A new use order for the plurality of target sets is generated. Generating the new use order includes moving a first target set of the plurality of target sets to a least-recently-used position, responsive to a purge of the first target set. The LRU state of the plurality of target sets is updated based on the new use order for the plurality of target sets, responsive to the purge of the first target set. The first target set is identified as eligible for replacement according to an LRU replacement policy of the TLB, based at least in part on the purge of the first target set.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, a translation lookaside buffer (TLB), such as a TLB2, generally includes a plurality of compartments, each of which includes a plurality of page table entry (PTE) sets. For instance, a PTE set can include a virtual page number and the corresponding physical page number to which the virtual page number is mapped by a page table. Each compartment of PTE sets is associated with a least-recently-used (LRU) state. Specifically, there may exist a fixed count of available LRU states, such as 256, where each compartment is associated with one of these available LRU states. The LRU states may be repeated across compartments, but need not be, such that various compartment may share an LRU state. The LRU state of a compartment indicates the least-recently-used order, or use order, of the PTE sets in that compartment. For example, six PTE sets per compartment are orderable in 720 possible use orders, and thus 720 corresponding LRU states may be available for each compartment having six PTE sets. Each LRU state represents a corresponding use order, and each use order maps to its corresponding LRU state. Thus, there may exist a one-to-one mapping between possible use orders and possible LRU states. Conventionally, each PTE set is associated with a validity bit, indicating whether that PTE set is valid or invalid. After a purge is performed on a PTE set, that PTE set's validity bit is unset, or set to invalid, thus indicating that the PTE set has become invalid due to the purge.

The TLB maintains translations that have been used and are thus likely to be needed in the near future. However, from time to time, adding a new translation requires replacing a PTE set in the TLB. Conventionally, when determining which PTE set to replace within a selected compartment, a memory management unit (MMU) first checks the validity bits of the PTE sets in the compartment, and ideally an invalid PTE set is identified. The data in that invalid PTE set is then replaced with data that represents the new translation being stored. If no invalid PTE set is identified in the compartment, however, then the MMU checks the LRU state of the compartment to determine the use order associated with the compartment. This use order indicates which PTE set has been least recently used, and the data of that least-recently-used PTE set is replaced by the new translation.

However, in some systems, the validity bits of the PTE sets are unavailable when enforcing the LRU replacement policy. Thus, in such systems, there is no adequate way to determine which PTE sets have been purged or are otherwise invalid and should thus be replaced first when inserting new translations into the TLB. As a result, PTE sets that have been purged are treated as if they haven't been purged when determining which PTE set in a compartment to replace. Thus, a PTE set that is valid and could have been retained in the TLB for a longer period might be replaced over a PTE set that is now invalid due to a purge. As a result, the TLB loses some of its effectiveness.

Turning now to an overview of the aspects of the invention, one or more embodiments of the invention address the above-described shortcomings of the prior art by providing a mechanism for incorporating purge history into the LRU states of a TLB. Specifically, in some embodiments of this invention, when a purge is performed on a PTE set, the LRU state of the associated compartment is recalculated with the purged PTE set being treated as the least-recently-used PTE set, regardless of when that PTE set was used last. In other words, while a particular PTE set may or may not be the least recently used, a purge performed on that PTE set may trigger a reordering of the PTE sets in the applicable compartment and further a redetermination of the corresponding LRU state to match the new use order. In some embodiments, the LRU state therefore inherently incorporates an indication of prior purges in the compartment, and thus no validity bit need be considered when enforcing an LRU replacement policy.

Technical effects and benefits of the present invention include the ability to maintain a more effective TLB, such that PTE sets are not replaced prematurely. When purged PTE sets are not replaced ahead of valid PTE sets, then the TLB effectively operates below capacity, and some embodiments of this invention may reduce or eliminate this occurrence. As a result, address translations may be performed more efficiently as compared to conventional systems, as the TLB is being used at full or improved capacity.

Figure 1:
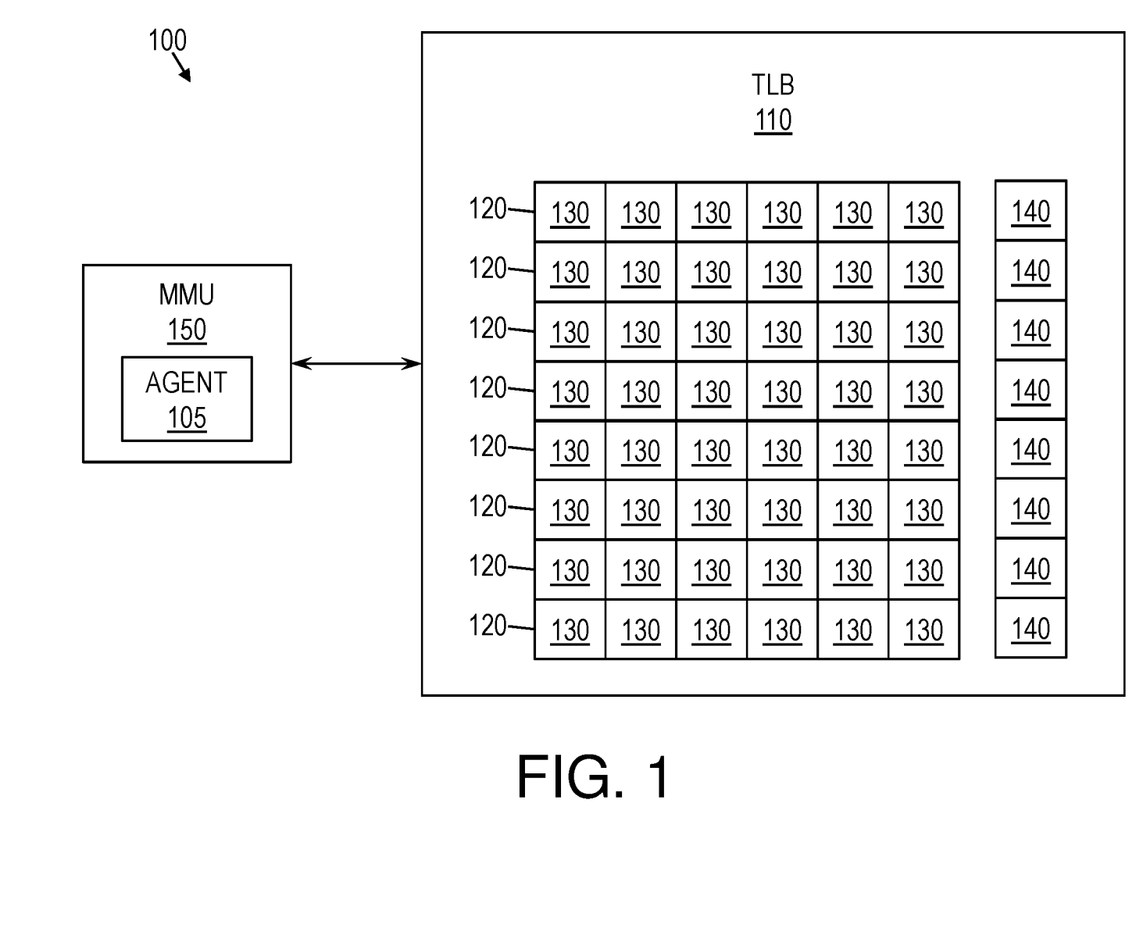
FIG. 1 illustrates a management system according to embodiments of this invention.

Turning now to a more detailed description of aspects of the present invention, FIG. 1 illustrates a management system 100 according to embodiments of the invention. As shown in FIG. 1, the management system 100 may operate on a TLB 110 of a computer system 400 (FIG. 4), such as a TLB2, which may include a plurality of compartments 120. Each compartment 120 may include a plurality of PTE sets 130, such as six PTE sets, for example. Each compartment 120 and its associated PTE sets 130 may be associated with a corresponding LRU state 140, which may indicate a use order in which the PTE sets 130 were used while also incorporating information about purge history of the PTE sets 130. In some embodiments, an LRU replacement policy of the TLB 110 lacks access to a validity bit of each PTE set 130 of the compartments 120. In such embodiments, there may be no validity bits of the PTE sets 130, or the LRU replacement policy cannot or does not check validity bits.

In some embodiments, as shown in FIG. 1, the management system 100, is integrated in whole or in part with an MMU 150 of the computer system 400 utilizing the TLB 110 for virtual-to-physical address translations. For example, as shown, an agent 105 of the management system 100 may execute as part of the MMU 150, thus enabling the management system 100 to perform the tasks described in this disclosure.

When a PTE set 130 is purged (i.e., when the data representing a translation is deleted from the PTE set 130) from a compartment 120, the management system 100 may generate a new use order of the PTE sets 130 in that compartment 120. Specifically, the purged PTE set 130 may be deemed to be the least-recently-used PTE set 130 in the compartment 120. For example, and not by way of limitation, the use order may be represented as a first-in-first-out queue, and generating a new use order may include removing from the queue a pointer to the purged PTE set 130 and pushing that pointer onto the top of the queue. If multiple PTE sets 130 are purged from the compartment 120, then in some embodiments, the order of those multiple PTE sets 130 relative to one another may be an arbitrary choice, so long as those multiple PTE sets 130 are placed as less recently used than other, valid PTE sets 130 of the compartment 120. With the new use order established, the management system 100 may update the LRU state 140 of the compartment. Specifically, in some embodiments, as there is a one-to-one mapping between use orders and LRU states 140, the management system 100 may select the LRU state 140 corresponding to the new use order. The selected LRU state 140 may then be used as the LRU state 140 of the compartment 120 after the purge.

As a result, the LRU state 140 of the compartment 120 corresponding to an ordering that effectively indicates that the purged PTE set 130 is least recently used, and thus that PTE set 130 will be replaced before other PTE sets 130 of the compartment 120 that have not been purged since their last use. When an address translation is needed that is not identified in the TLB 110, and when a compartment 120 is selected for replacement by mechanisms known in the art, the incorporation of purge history into the LRU state 140 may then result in purged PTE sets 130 being replaced before valid PTE sets 130, regardless of when those purged PTE sets 130 were last used.

Figure 2:
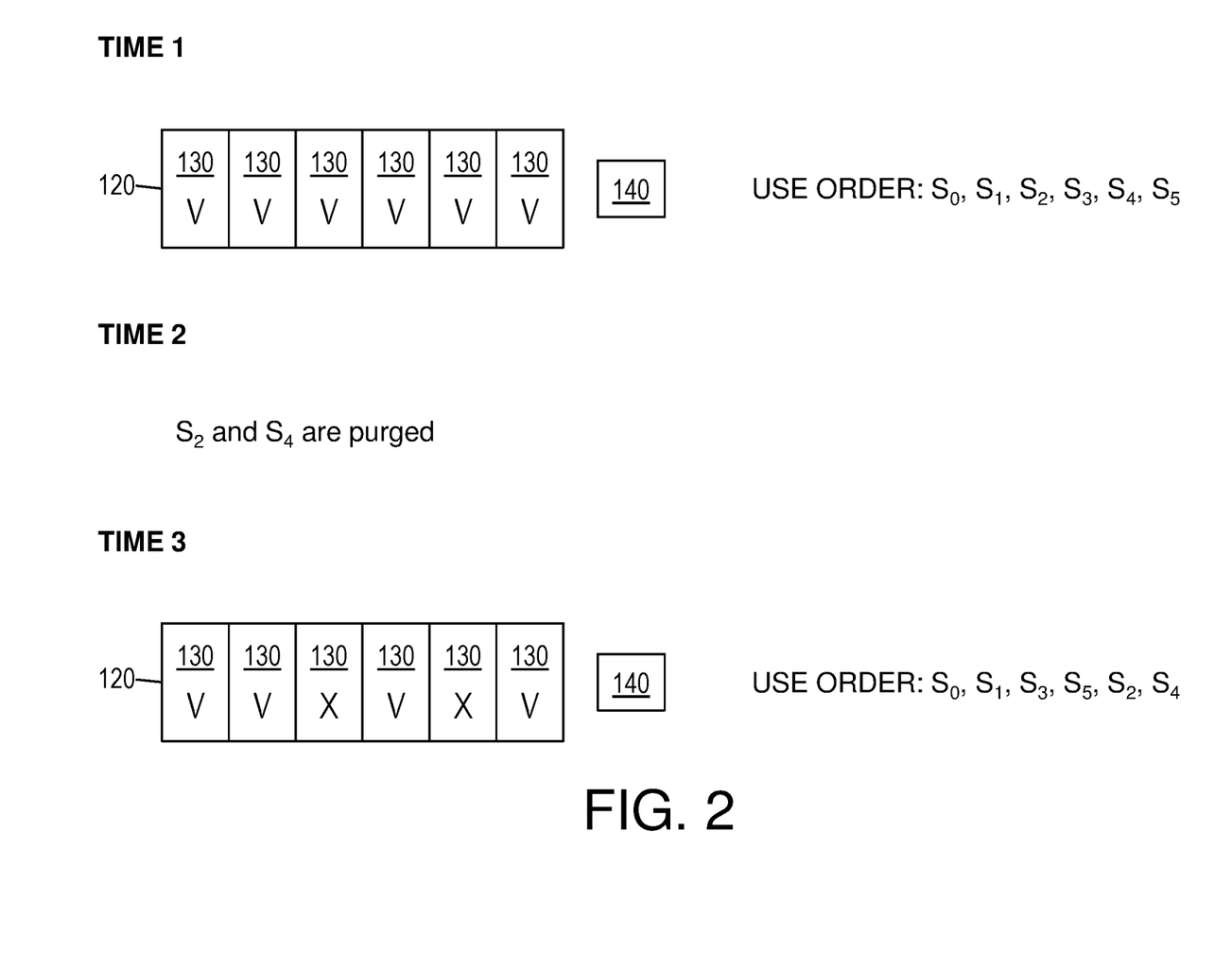
FIG. 2 illustrates handling of an example purge in a translation lookaside buffer, according to some embodiments of this invention.

FIG. 2 illustrates handling of an example purge in the TLB 110, according to some embodiments of the invention. Specifically, FIG. 2 illustrates a purge applied to two PTE sets 130 of a first compartment 120 among the plurality of compartments 120, where each compartment 120 includes six PTE sets 130, $\{S_0, S_1, S_2, S_3, S_4, S_5\}$. In the example illustrated, at Time 1, all PTE sets 130 of the first compartment 120 are valid, as indicated in FIG. 2 by letter Vs. In this example, the use order of the PTE sets 130 from most to least recently used is $\{S_0, S_1, S_2, S_3, S_4, S_5\}$.

At Time 2, two PTE sets 130, $S_2$ and $S_4$, of the first compartment 120 are purged. According to some embodiments, the order in which the PTE sets are purged need not play a role in determining the LRU state of the first compartment 120.

At Time 3, $S_2$ and $S_4$ of the PTE sets 130 have been purged and are therefore invalid, as indicated by letter Xs in FIG. 2. The remaining four PTE sets 130 of the first compartment 120 remain valid. According to some embodiments, the management system 100 or other component of the applicable computer system determines a new use order of the PTE sets 130 as $\{S_0, S_1, S_3, S_5, S_2, S_4\}$, for example. However, it will be understood that $\{S_0, S_1, S_3, S_5, S_4, S_2\}$ would also be an appropriate use order for this example, given that the order of purge need not play a role in the LRU state according to some embodiments. Based on this new use order, the management system 100 may determine a new LRU state 140 of the first compartment 120, based on the mapping between use orders and LRU states 140.

Although this disclosure focuses on the incorporation of purge history into an LRU state 140 associated with the least-recently-used ordering of PTE sets 130 in a compartment 120, it will be understood to one skilled in the art that embodiments of this invention may be used to incorporate purge history into LRU states 140 of various types of target sets associated with a TLB 110. For example, and not by way of limitation, a management system 100 according to some embodiments of this invention may be used to incorporate purge history into an LRU state 140 associated with a least-recently-used ordering of the compartments 120 themselves. In that case, a set of compartments 120 of the TLB 110 would behave as target sets associated with an LRU state 140 that incorporates purge history.

Figure 3:
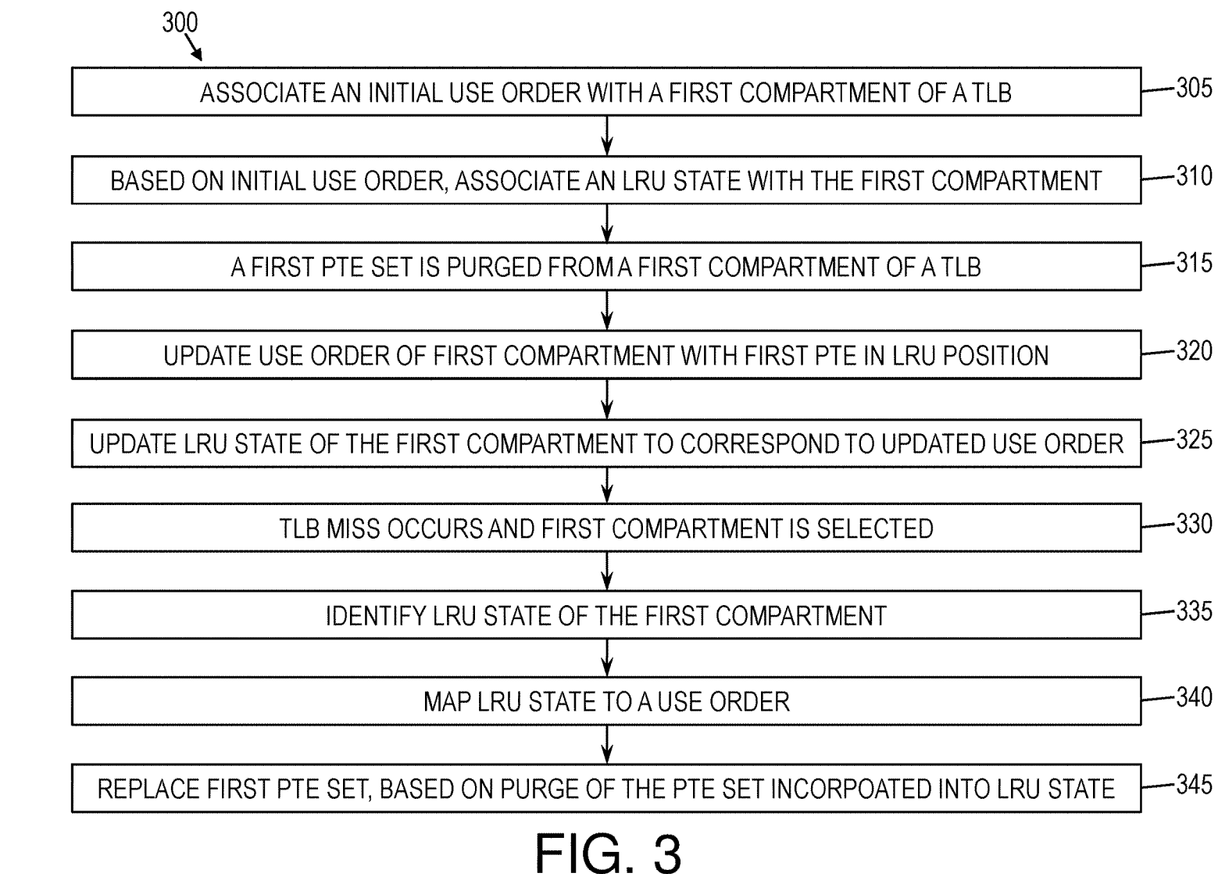
FIG. 3 is a flow diagram of a method for utilizing the translation lookaside buffer, according to some embodiments of this invention.

FIG. 3 is a flow diagram of a method 300 for utilizing a TLB 110, according to some embodiments of this invention. As shown in FIG. 3, at block 305, an initial use order is associated with a first compartment 120, where that initial use order indicates an order of use of the PTE sets 130 of the first compartment 120. At block 310, an initial LRU state 140 is associated with the first compartment, based on the initial use order. At block 315, a first PTE set 130 is purged from a first compartment 120. At block 320, the use order of the first compartment 120 is updated with the first PTE set 130 placed as the least-recently-used PTE set 130 in the first compartment 120. In some embodiments, the other PTE sets 130 of the first compartment 120 retain their current order relative to one another. At block 325, the LRU state 140 of the first compartment 120 may be updated to correspond to the updated use order. According to this updated use order, the first PTE set 130 may now be eligible for replacement, as the first PTE set 130 occupies the least-recently-used position.

At block 330, a TLB miss may occur, and the first compartment 120 may be selected for replacement of a PTE set 130. At block 335, the LRU state 140 of the first compartment 120 may be identified. At block 340, the LRU state 140 may be mapped to a use order of the first compartment 120, where that use order incorporates the purge history of the first compartment 120, including the purge of the first PTE set 130. At block 345, a new translation may be inserted into the first compartment 120 to replace the PTE set 130 (i.e., to replace the data stored in the PTE set) deemed to be least recently used in the first compartment 120. Given the above update of the LRU state 140, the PTE set 130 identified as eligible for replacement may be the first PTE set 130, which was purged.

Figure 4:
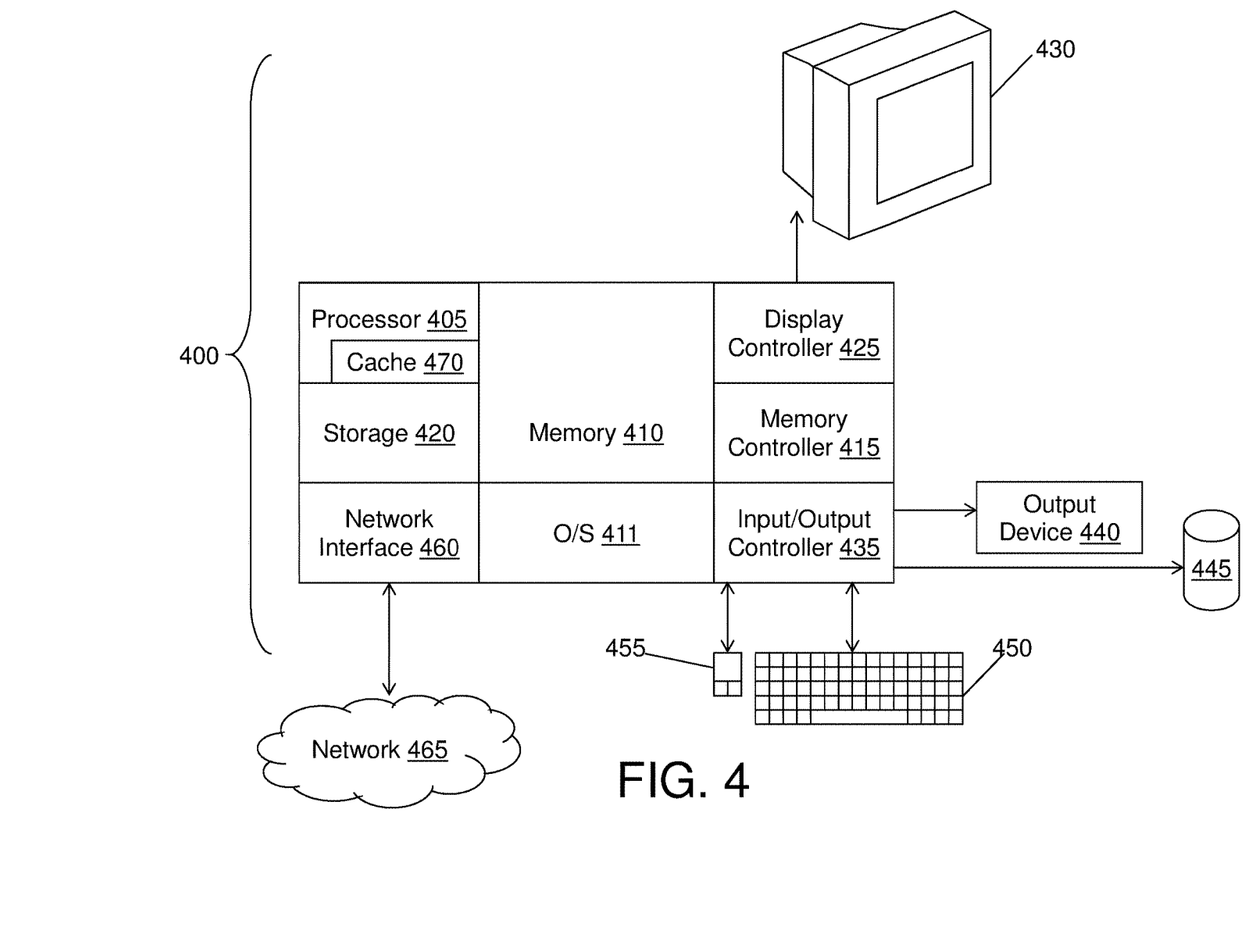
FIG. 4 illustrates a block diagram of a computer system for use in implementing a management system or method according to some embodiments of this invention.

FIG. 4 illustrates a block diagram of a computer system 400 for use in implementing a management system 100 or method according to some embodiments of this invention. The management systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a TLB 110 used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the management systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Management systems 100 and methods according to this disclosure may be embodied, in whole or in part, in computer program products or in computer systems 400, such as that illustrated in FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A system comprising:
a memory having computer-readable instructions; and one or more processors for executing the computer-readable instructions, the computer-readable instructions comprising:

associating an initial use order with a plurality of target sets of a translation lookaside buffer (TLB), wherein the initial use order indicates an order of use of the plurality of target sets;

associating the plurality of target sets with an initial least-recently-used (LRU) state based on the initial use order;

generating a new use order for the plurality of target sets, wherein the generating the new use order comprises moving a first target set of the plurality of target sets to a least-recently-used position, responsive to a purge of the first target set;

updating the LRU state of the plurality of target sets based on the new use order for the plurality of target sets, responsive to the purge of the first target set; and     identifying the first target set as eligible for replacement according to an LRU replacement policy of the TLB, based at least in part on the purge of the first target set.

2. The system of claim 1, wherein the LRU state incorporates a purge history of the plurality of target sets.

3. The system of claim 1, wherein the LRU replacement policy lacks access to a validity bit of the first target set of the plurality of target sets.

4. The system of claim 1, wherein a second target set of the plurality of target sets was used less recently than the first target set, and the computer-readable instructions further comprising replacing the first target set with a new translation prior to replacing the second target set, based on the purge of the first target set.

5. The system of claim 1, wherein the new use order indicates that each purged target set of the plurality of target sets is less recently used than each valid target set of the plurality of the target sets.

6. The system of claim 1, wherein the updating the LRU state of the plurality of target sets based on the new use order for the plurality of target sets, responsive to the purge of the first target set, comprises assigning to the plurality of target sets an LRU state to which the new use order maps.

7. A computer-program product for incorporating purge history into least-recently-used (LRU) states of a translation lookaside buffer (TLB), the computer-program product comprising a computer-readable storage medium having program instructions embodied therewith, the program instructions executable by a processor to cause the processor to perform a method comprising:

associating an initial use order with a plurality of target sets of a translation lookaside buffer (TLB), wherein the initial use order indicates an order of use of the plurality of target sets;

associating the plurality of target sets with an initial least-recently-used (LRU) state based on the initial use order;

generating a new use order for the plurality of target sets, wherein the generating the new use order comprises moving a first target set of the plurality of target sets to a least-recently-used position, responsive to a purge of the first target set;

updating the LRU state of the plurality of target sets based on the new use order for the plurality of target sets, responsive to the purge of the first target set; and     identifying the first target set as eligible for replacement according to an LRU replacement policy of the TLB, based at least in part on the purge of the first target set.

8. The computer-program product of claim 7, wherein the LRU state incorporates a purge history of the plurality of target sets.

9. The computer-program product of claim 7, wherein the LRU replacement policy lacks access to a validity bit of the first target set of the plurality of target sets.

10. The computer-program product of claim 7, wherein a second target set of the plurality of target sets was used less recently than the first target set, and the method further comprising replacing the first target set with a new translation prior to replacing the second target set, based on the purge of the first target set.

11. The computer-program product of claim 7, wherein the new use order indicates that each purged target set of the plurality of target sets is less recently used than each valid target set of the plurality of the target sets.

12. The computer-program product of claim 7, wherein the updating the LRU state of the plurality of target sets based on the new use order for the plurality of target sets, responsive to the purge of the first target set, comprises assigning to the plurality of target sets an LRU state to which the new use order maps.

13. The computer-program product of claim 7, wherein the plurality of target sets comprise a plurality of page table entry (PTE) sets within a compartment of the TLB.

* * * * *